United States Patent [19]
Sakata

[11] Patent Number: 6,166,764
[45] Date of Patent: Dec. 26, 2000

[54] CAMERA AND VEHICLE-SURROUNDINGS VISUAL-RECOGNITION APPARATUS USING THE SAME

[75] Inventor: Kazuki Sakata, Tokyo, Japan

[73] Assignee: Mitsubishi Denki Kabushiki Kaisha, Tokyo, Japan

[21] Appl. No.: 08/886,428

[22] Filed: Jul. 1, 1997

[30] Foreign Application Priority Data

Feb. 14, 1997 [JP] Japan .................................. 9-030264

[51] Int. Cl.[7] .............................. H04N 7/18; H04N 13/02
[52] U.S. Cl. ............................................. 348/148; 348/49
[58] Field of Search ..................................... 348/148, 149, 348/49, 36, 335, 340, 373, 118, 50, 337; 359/843, 844, 831, 832, 833, 834, 835, 836, 837; 340/435, 436, 903

[56] References Cited

U.S. PATENT DOCUMENTS

| | | | |
|---|---|---|---|
| 5,648,835 | 7/1997 | Uzawa | 396/429 |
| 5,708,529 | 1/1998 | Togino | 359/630 |
| 5,708,857 | 1/1998 | Ishibashi | 396/21 |
| 5,724,108 | 3/1998 | Shibata | 349/62 |

FOREIGN PATENT DOCUMENTS 8-108796  4/1996  Japan ............................... H04N 7/18

*Primary Examiner*—Wendy Garber
*Assistant Examiner*—Alicia M. Harrington
*Attorney, Agent, or Firm*—Sughrue, Mion, Zinn Macpeak & Seas, PLLC

[57] ABSTRACT

A camera provided with entrance windows, through each of which extraneous light are taken in, in both side portions of a housing, respectively. Further, an image pickup device is mounted in the housing. Moreover, an optical element is placed in a stage prior to the aforesaid image pickup device. This optical element reflects the extraneous light once, which is incident from a one of the aforesaid entrance windows, and forms an inverted mirror image on an area of an imaging plane of the aforesaid image pickup device, which corresponds to the one of the aforesaid entrance windows. Moreover, this optical element reflects the extraneous light once, which is incident from the other of the aforesaid entrance windows, and forms an inverted mirror image on an area of said imaging plane of said image pickup device, which corresponds to the other of the aforesaid entrance windows. Thus, in accordance with this camera, the reflection of the extraneous light is performed once. Thereby, the configuration of the camera is simplified. Further, the miniaturization of the camera is achieved.

16 Claims, 16 Drawing Sheets

CAMERA AND VEHICLE-SURROUNDINGS VISUAL-RECOGNITION APPARATUS USING THE SAME

BACKGROUND OF THE INVENTION

1. Field of the Invention

This invention relates to a camera being capable of simultaneously imaging scenes respectively seen in a plurality of directions and to an apparatus for visual recognition of surroundings of a vehicle, which uses such a camera.

2. Description of the Related Art

FIG. 11 is a diagram illustrating an operation of a vehicle equipped with a conventional apparatus for visual recognition of surroundings of a vehicle.

Generally, when a motor vehicle 15 is about to come in an intersection, a region indicated by oblique lines in FIG. 11 becomes a driver's blind spot 17. Further, the driver cannot visually recognize other motor vehicles 16 that are present in the left-side and right-side blind spots 17, respectively, as viewed in this figure.

Thus, to enable the driver to visually recognize the condition of the dead spot, there has been put to actual or practical use an apparatus for visual recognition of surroundings of the motor vehicle, in which a camera 18 is mounted on the front cover thereof and images of the left-side and right-side blind spots are simultaneously taken by the aforesaid camera 18 and thus the images of the blind spots are displayed on the screen of a monitor television 8 as shown in FIG. 12.

Next, an example of the conventional camera will be described hereinbelow with reference to FIG. 13.

Outer casing 4 serving as a housing is provided with entrance windows 4a and 4b in the left and right side portions thereof, respectively, so that extraneous light coming from the right and left can be incident thereon. Further, an image formation lens 3 is mounted in the outer casing 4. Image pickup device 13 constituted by CCD is placed at a focal point of the image formation lens 3. Moreover, a pair of first mirrors 10a and 10b are disposed at the left and right sides of the image formation lens 3, respectively. Furthermore, a pair of second mirrors 11a and 11b are placed in such a manner as to face the first mirrors 10a and 10b, respectively.

In the case of a camera 18A configured in this manner, extraneous light 5a coming from the right (namely, from above as viewed in FIG. 13) is incident on the outer casing 4 through the entrance window 4a. First, the extraneous light 5a is reflected by the first mirror 10a. Subsequently, the extraneous light 5a is further reflected by the second mirror 11a. Then, the extraneous light 5a reflected by this second mirror 11a is led to the image formation lens 3, so that an inverted (or vertically-flipped) normal image is formed on the left-side half of an imaging plane (namely, an image pickup plane) of the image pickup device 13.

On the other hand, the extraneous light 5b coming from the left (namely, from below as viewed in FIG. 13) is incident on the outer casing 4 through the entrance window 4b. Then, the extraneous light 5b is first reflected by a first mirror 10b. Subsequently, the extraneous light 5b is further reflected by the second mirror 11b. The extraneous light 5b reflected by this second mirror 11b is led to the image formation lens 3, so that an inverted normal image is formed on a right half of the imaging plane of the image pickup device 13.

Thus, this camera 18A is applied to an apparatus for visual recognition of surroundings of a vehicle, a picture signal representing an inverted normal image, which is formed from light received by the image pickup device 13, is displayed on the screen of the monitor television so that a scene, whose image is taken, is displayed in such a way as to be upside down. Thus, as illustrated in FIG. 12, a normal image formed from the extraneous light 5a coming from the right is displayed on the right-hand part of the screen of the monitor television 8. Further, another normal image formed from the extraneous light 5b coming from the left is displayed on the left-hand part of the screen of the monitor television 8. Thus, the driver can check the conditions of the left and right blind spots from the screen of the monitor television.

In the case of this camera 18A, a normal image is obtained by reflecting the extraneous light 5a (or 5b) two times by means of the first and second mirrors 10a and 11a (or 10b and 11b), namely, by changing an image, which is obtained as a mirror image by the first mirror 10a (or 10b), into the normal image by the use of the second mirror 11a (or 11b).

Here, note that when using only the first mirror 10a (or 10b) without using the second mirror 11a (or 11b), an image formed from light, which is received by the image pickup device 1, is an inverted mirror image. In this case, a mirror image CCD, which is operative to output a received light signal by horizontally flipping an image represented by the signal, is used as the image pickup device 13. Further, an inverted mirror image, which is represented by a picture signal obtained from the received light, is flipped from side to side, so that a picture signal representing an inverted normal image is outputted from the image pickup device 13. Moreover, this picture signal is displayed on the screen of the monitor television in such a manner that the image is upside down. Thus, as shown in FIG. 14, a normal image obtained from the extraneous light 5b coming from the left is unwillingly displayed on the right-hand half 8a of the screen of the monitor television 8. Furthermore, a normal image obtained from the extraneous light 5a coming from the right is unwillingly displayed on the left-hand half 8b of the screen of the monitor television 8. As a result, the direction, in which an image is displayed on the screen of the monitor television, is opposite to the direction of incidence of the light representing the image. Consequently, the images displayed on the screen of the monitor television is difficult for the driver to observe.

Next, another example of a conventional camera will be described hereinbelow with reference to FIG. 15.

This conventional camera 18B has a similar structure as of the aforementioned camera 18A except that prisms are used instead of reflection mirrors and that a mirror CCD is used as the image pickup device 13. Namely, a pair of prisms 6a and 6b are placed in a stage prior to the image formation lens 3 in such a way as to be on the upper and lower sides of the central axis and be parallel with each other.

In the case of the camera 18B configured in this way, the extraneous light 5a coming from the right (namely, from the right as viewed in FIG. 15) is incident on the outer casing 4 through the entrance widow 4a, and then is incident on the prism 6a and subsequently, is reflected by a reflection surface 7a and is then led to the image formation lens 3. Finally, an inverted mirror image is formed on the lower half of the imaging plane of the image pickup device 13.

On the other hand, the extraneous light 5b coming from the left (namely, from the left as viewed in FIG. 15) is incident on the outer casing 4 through the entrance window 4b, and is then incident on the prism 6b, and is subsequently reflected by the reflection surface 7b and is then led to the image formation lens 3. Finally, an inverted mirror image is formed on the upper half of the imaging plane of the image pickup device 13.

In the case this camera 18B, the reflection is performed once, so that the miniaturization of the camera can be achieved. However, an image formed in the image pickup device 13 is unwillingly a mirror image.

Thus, in the case that this camera 18B is applied to an apparatus for visual recognition of surroundings of a vehicle, a picture signal representing an inverted normal image, which is formed from light received by the image pickup device 13 in such a manner as to be flipped from side to side, is displayed on the screen of the monitor television so that a scene, whose image is taken, is displayed in such a way as to be upside down. Thus, as illustrated in FIG. 16, a normal image formed from the extraneous light 5a coming from the right is displayed on the upper half 9a of the screen of the monitor television 8. Further, another normal image formed from the extraneous light 5b coming from the left is displayed on the lower half 9b of the screen of the monitor television 8. Thereby, the driver can check the conditions of the left and right blind spots from the screen of the monitor television.

In the case of the conventional camera 18A using reflection mirrors, the incident light is reflected twice by the first and second mirrors. Therefore, this conventional camera has a problem that the size thereof is large.

On the other hand, in the case of the conventional camera 18B using two prisms, a normal image formed from the extraneous light 5a coming from the right is displayed on the upper screen of the monitor television, while a normal image formed from the extraneous light 5b coming from the left is displayed on the lower screen of the monitor television. This camera 18B, therefore, has problems that when applying this camera 18B to the apparatus for visual recognition of surroundings of a vehicle, the image displayed on the screen of the monitor television is difficult for the driver to observe, and that this camera 18B requires a plurality of prisms and thus a reduction in the cost thereof cannot be achieved.

SUMMARY OF THE INVENTION

The present invention is accomplished to solve the foregoing problems.

Accordingly, an object of the present invention is to obtain a small-size inexpensive camera adapted so that the reflection of light is performed only once to thereby simplify the configuration thereof.

Further, another object of the present invention is to obtain an apparatus for visual recognition of surroundings of a vehicle, in which a normal image formed from extraneous light coming from the right is displayed on the right-hand screen of a monitor television and another normal image formed from extraneous light coming from the left is displayed on the left-hand screen of the monitor television to thereby obtain the images which are easy for a driver to observe.

To achieve the foregoing object, in accordance with an aspect of the present invention, there is provided a camera that comprises: a housing having entrance windows, through each of which extraneous light are taken in, in both side portions thereof, respectively; an image pickup device mounted in this housing; and an optical element for reflecting the aforesaid extraneous light once, which is incident from a one of the aforesaid entrance windows, and for forming an inverted mirror image on an area of an imaging plane of the aforesaid image pickup device, which is on same side of the aforesaid one of the aforesaid entrance windows, and for reflecting the aforesaid extraneous light once, which is incident from the other of the aforesaid entrance windows, and for forming an inverted mirror image on an area of the aforesaid imaging plane of the aforesaid image pickup device, which is on same side of the aforesaid other of the aforesaid entrance windows.

In accordance with another aspect of the present invention, there is provided an apparatus for visual recognition of surroundings of a vehicle, which comprises: a housing mounted in a front portion of a vehicle and provided with left-side and right-side entrance windows, through each of which extraneous light is taken in, in both of left and right side portions thereof in a travelling direction of said vehicle, respectively; an image pickup device mounted in this housing so that an imaging plane thereof faces a region located in front of the aforesaid vehicle; an optical element for reflecting the aforesaid extraneous light once, which is incident from the aforesaid left-side entrance window, and for forming an inverted mirror image on a left-side area of an imaging plane of the aforesaid image pickup device, which corresponds to the aforesaid left-side entrance window, and for reflecting the aforesaid extraneous light once, which is incident from the aforesaid right-side entrance window, and for forming an inverted mirror image on a right-side area of the aforesaid imaging plane of the aforesaid image pickup device, which corresponds to the aforesaid right-side entrance window; signal conversion means for converting a picture signal, which represents the inverted mirror image formed on the aforesaid imaging plane, into an image signal which represents an inverted normal image obtained by flipping the inverted mirror image from side to side; and display means for inputting the image signal, which represents the inverted normal image, from the aforesaid signal conversion means and for displaying an erected normal image.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

Hereinafter, the preferred embodiments of the present invention will be described in detail by referring to the accompanying drawings.

Embodiment 1

Figure 1:
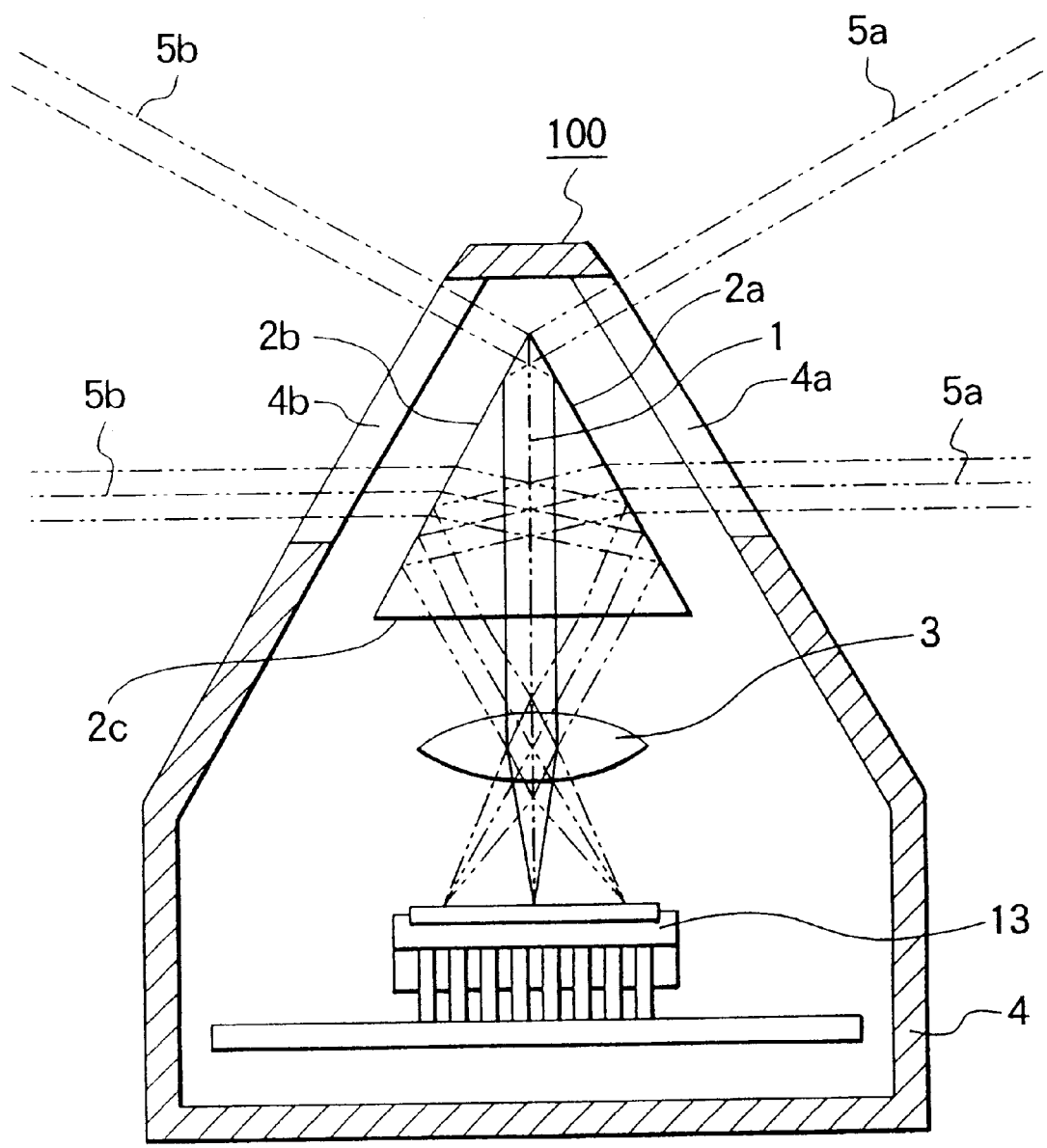
FIG. 1 is a sectional view of a camera in accordance with a first embodiment of the present invention.
Figure 13:
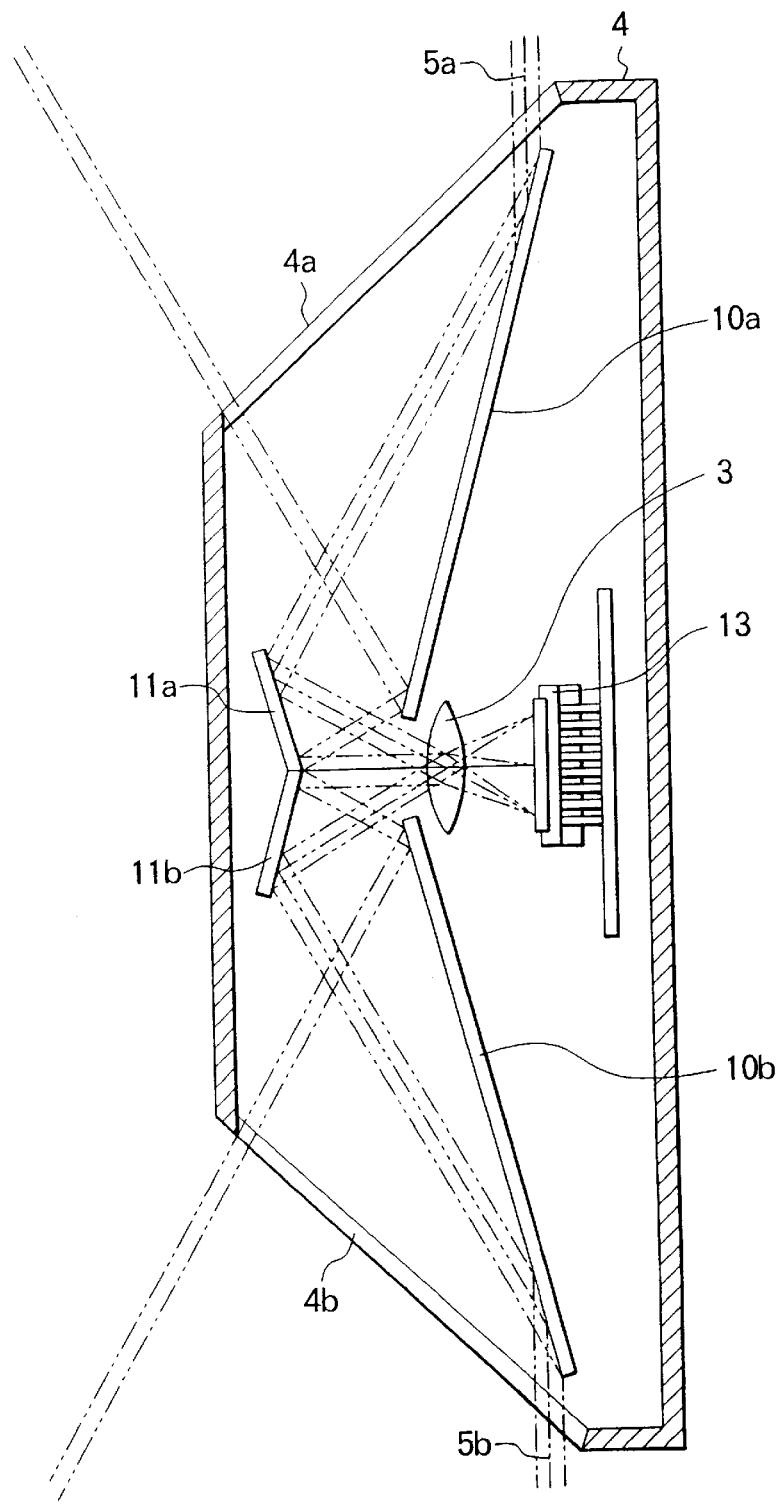
FIG. 13 is a sectional view of an example of the conventional camera.
Figure 14:
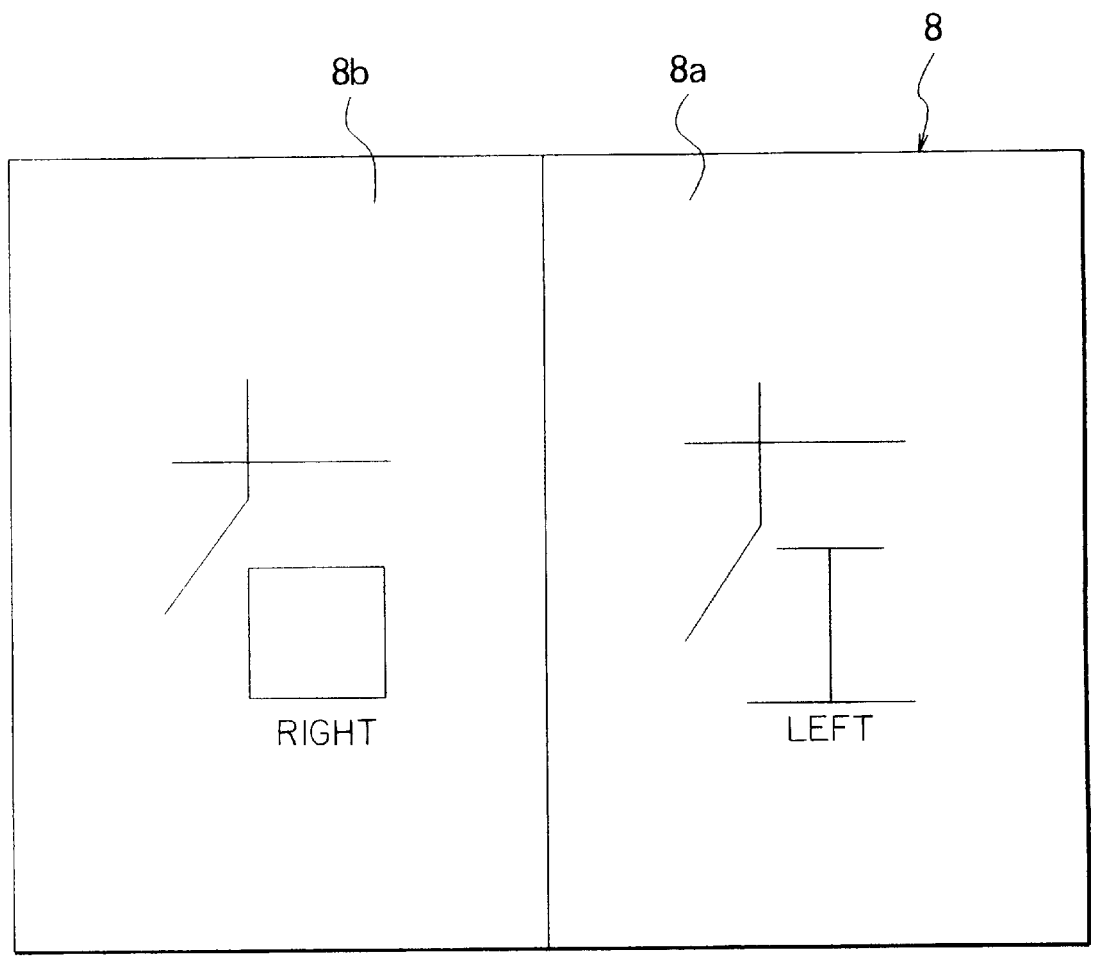
FIG. 14 is a front view of a display presented on the screen of a monitor television in the conventional apparatus for visual recognition of surroundings of a vehicle, which is equipped with the conventional camera.
Figure 15:
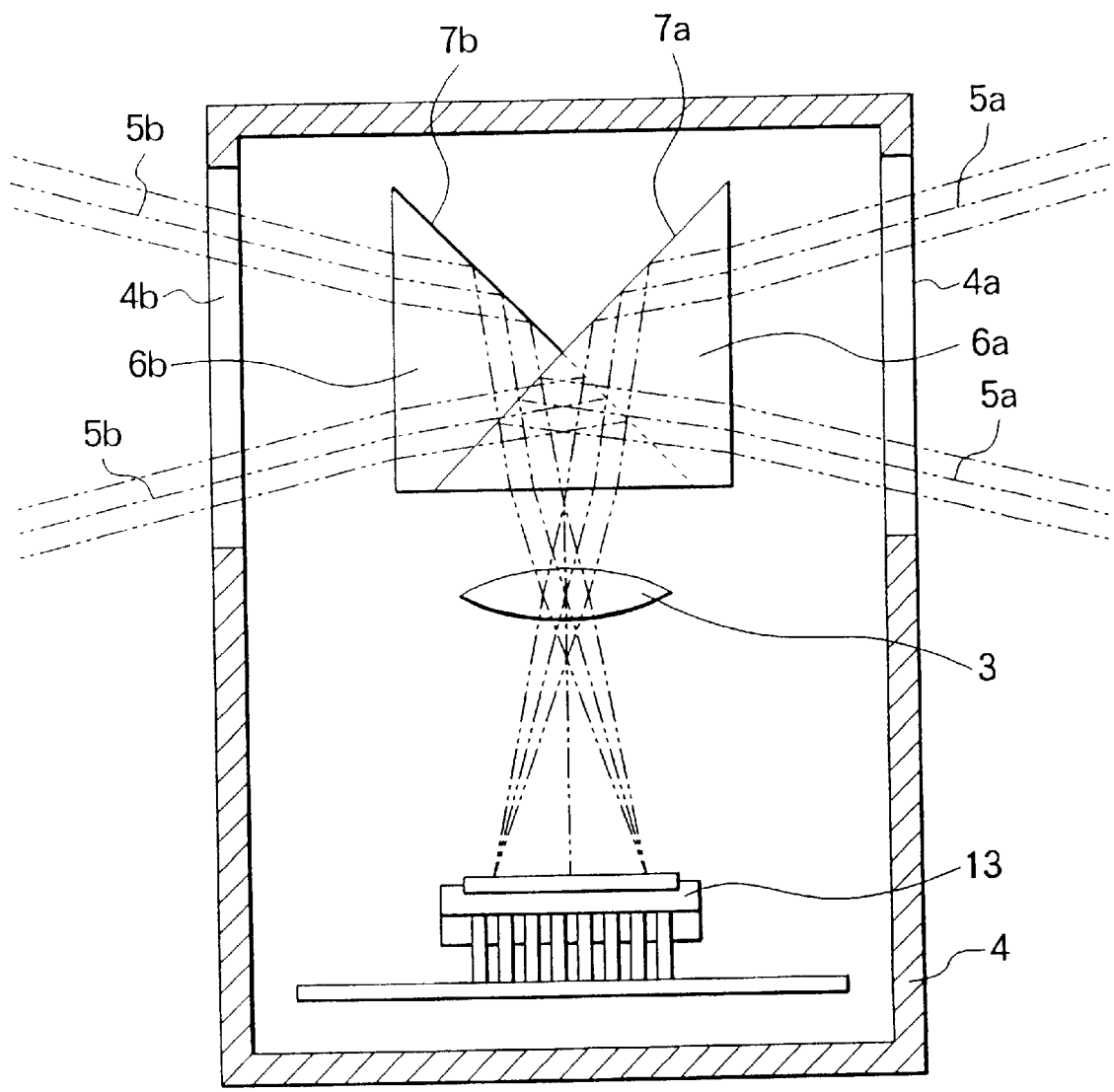
FIG. 15 is a sectional view of another example of the conventional camera.
Figure 16:
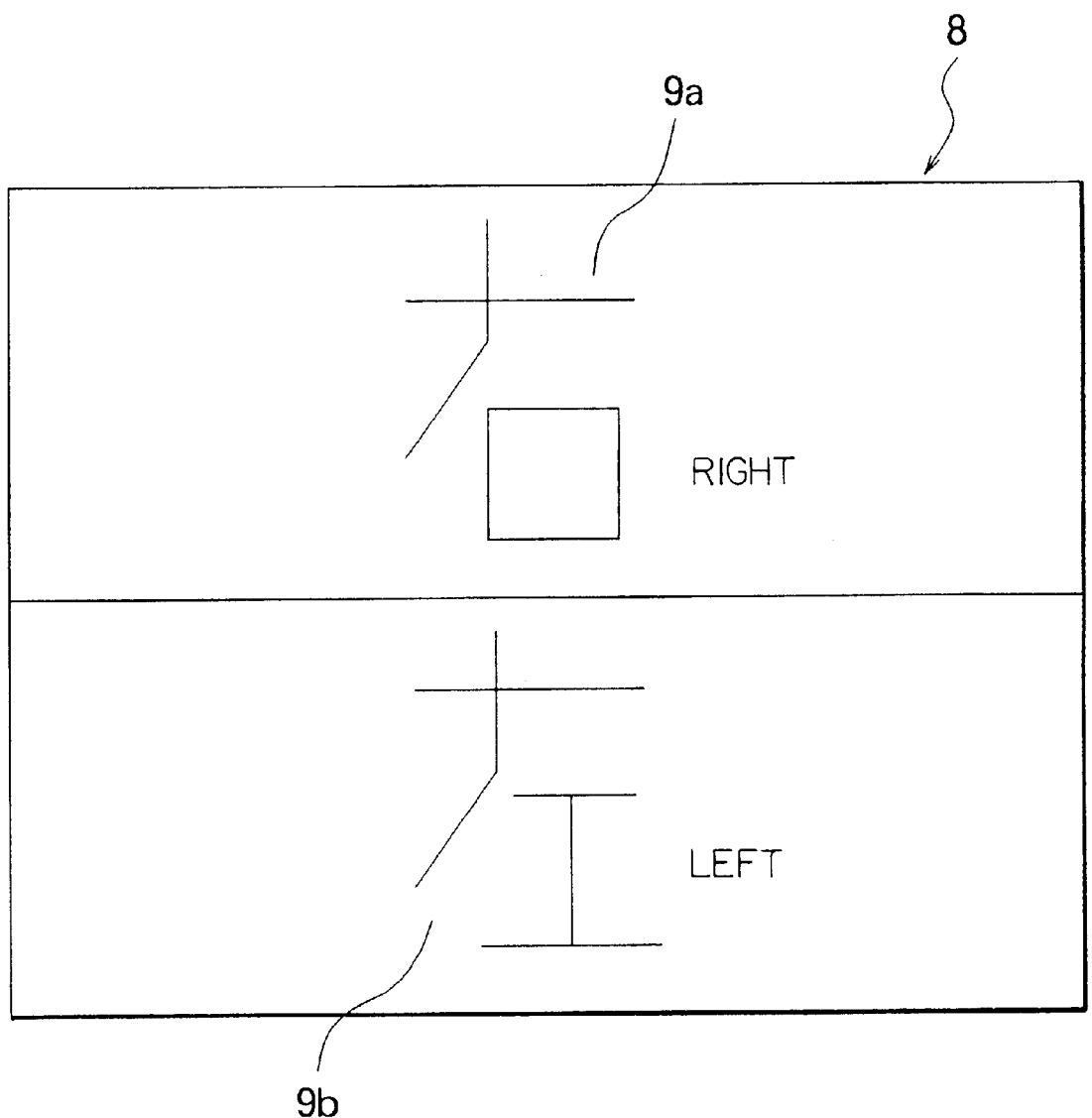
FIG. 16 is a front view of a display presented on the screen of a monitor television in the conventional apparatus for visual recognition of surroundings of a vehicle, which is equipped with this conventional camera.

FIG. 1 is a sectional view of a camera in accordance with a first embodiment of the present invention. In this figure, same reference characters designate same or corresponding parts of the conventional cameras illustrated in FIGS. 13 and 15. Further, the descriptions of such parts are omitted.

In the case of this Embodiment 1, a prism 1 formed as a square pillar (prism element), whose section is shaped like an isosceles triangle, is disposed in a stage prior to an image formation lens 3. Further, the prism 1 is placed in such a manner that the bisector of a vertex angle of the isosceles triangle coincides with an optical axis of the image formation lens 3, that the ridge portion (namely, the intersection part between surfaces 2a and 2b) consisting of vertexes of the isosceles triangle intersects with the optical axis of the image formation lens 3 in an upward or downward direction, and that a surface (namely, a surface 2c) composed of bases of the isosceles triangles is orthogonal to the optical axis of the image formation lens 3.

Further, the optical element is comprised of the prism 1 and the image formation lens 3. Moreover, a mirror CCD is used as an image pickup device 13. Namely, this mirror CCD further functions as a signal conversion means for flipping an image, which is represented by a picture signal obtained from received light, from side to side and for outputting an image signal representing the flipped image.

Extraneous light 5a coming from the right (namely, from the right as viewed in FIG. 1) is incident on the outer casing 4 through the entrance window 4a and reaches a prism 1. Further, the extraneous light 5a is transmitted by the surface 2a and is incident on the prism 1. Subsequently, the extraneous light 5a undergoes an internal reflection on the surface 2b. Then, the extraneous light 5a is transmitted by the surface 2c and exits from the prism 1. Extraneous light 5a exiting from the prism 1 is then incident on the image formation lens 3, so that an inverted mirror image is formed on the right half of the imaging plane of the image pickup device 13.

On the other hand, the extraneous light 5b coming from the left (namely, from the left as viewed in FIG. 1) is incident on the outer casing 4 through the entrance window 4b and then reaches the prism 1. Then, the extraneous light 5b is transmitted by the surface 2b and is incident on the prism 1. Subsequently, the extraneous light 5b undergoes an internal reflection on the surface 2a. The extraneous light 5b reflected by this surface 2a is transmitted by the second surface 2c and then exits from the prism 1. Then, the extraneous light 5b exiting from the prism 1 is incident on the image formation lens 3, so that an inverted mirror image is formed on a left half of the imaging plane of the image pickup device 13.

Thus, when this camera 100 is applied to an apparatus for visual recognition of surroundings of a vehicle, this camera 100 is mounted on the front bumper of the vehicle in such a way that the optical axis of the image formation lens extends horizontally, and that the ridge portion, in which a ridge portion serving as the intersection portion between the surfaces 2a and 2b, faces a place in front of the vehicle. Moreover, the camera 100 is connected with a monitor television so that an output of the image pickup device 13 is inputted to the monitor television acting as display means.

Figure 2:
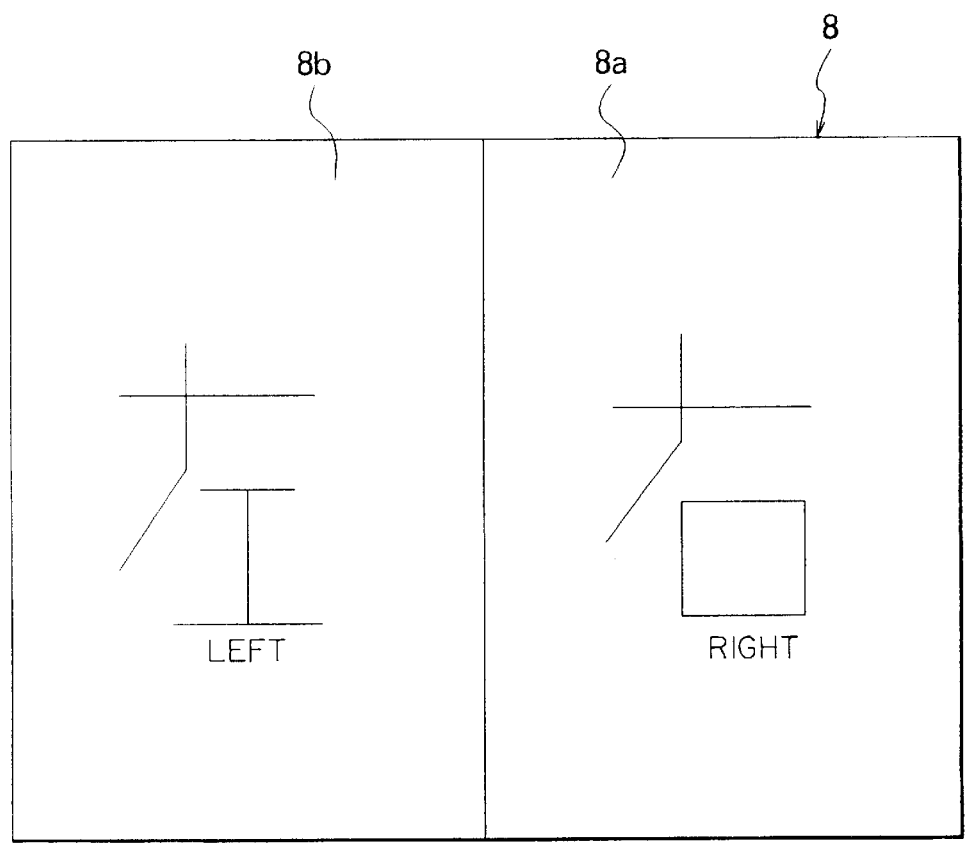
FIG. 2 is a front view of a display presented on the screen of a monitor television in an apparatus for visual recognition of surroundings of a vehicle which is equipped with the camera in accordance with the first embodiment of the present invention.

Further, an inverted mirror image obtained from the extraneous light 5a coming from the right-hand side of the vehicle is formed on the right-hand half 8a of the imaging plane of the image pickup device 13. Furthermore, an inverted mirror image obtained from the extraneous light 5b coming from the left-hand side of the vehicle is formed on the left-hand half of the imaging plane of the image pickup device 13. Picture signal representing the inverted mirror image obtained from the light received by this image pickup device 13 is converted into an image signal representing an inverted normal image obtained by flipping the inverted mirror image from side to side. Image signal obtained in this way is outputted from the image pickup device 13 and is displayed on the screen of the monitor television so that the inverted normal image is upside down. Thus, as illustrated in FIG. 2, an erected normal image formed from the extraneous light 5a coming from the right is displayed on the right-hand half or part 9a of the screen of the monitor television 8. Further, another erected normal image formed from the extraneous light 5b coming from the left is displayed on the left-hand half 9b of the screen of the monitor television 8. Thereby, the driver can check the conditions of the left-side and right-side blind spots from the screen of the monitor television 8.

Thus, in the case of this "Embodiment 1", the prism 1 formed like a prism element, whose section is shaped like an isosceles triangle, is provided in a stage prior to the imaging lens 3. Further, an inverted mirror image obtained from the extraneous light 5a having been incident from the surface 2a is formed on an area on the side of the surface 2a of the image pickup device 13, while an inverted mirror image obtained from the extraneous light 5b having been incident from the surface 2b is formed on an area on the side of the surface 2b of the image pickup device 13. Thus, the reflection of the extraneous light is performed only once. The configuration of the camera can be simplified. Consequently, a compact inexpensive camera is obtained.

Further, as a result of mounting this camera 100 on a vehicle, an erected normal image obtained from the extraneous light coming from the right is displayed on the right-hand screen of the monitor television 8. Moreover, a normal image obtained from the extraneous light coming from the left is displayed on the left-hand screen thereof. Thus, the direction, in which an image is displayed on the screen of the monitor television 8, is in agreement with the direction of incidence of the light representing the image. Consequently, the images displayed on the screen of the monitor television is easy for the driver to observe.

Embodiment 2

Figure 3:
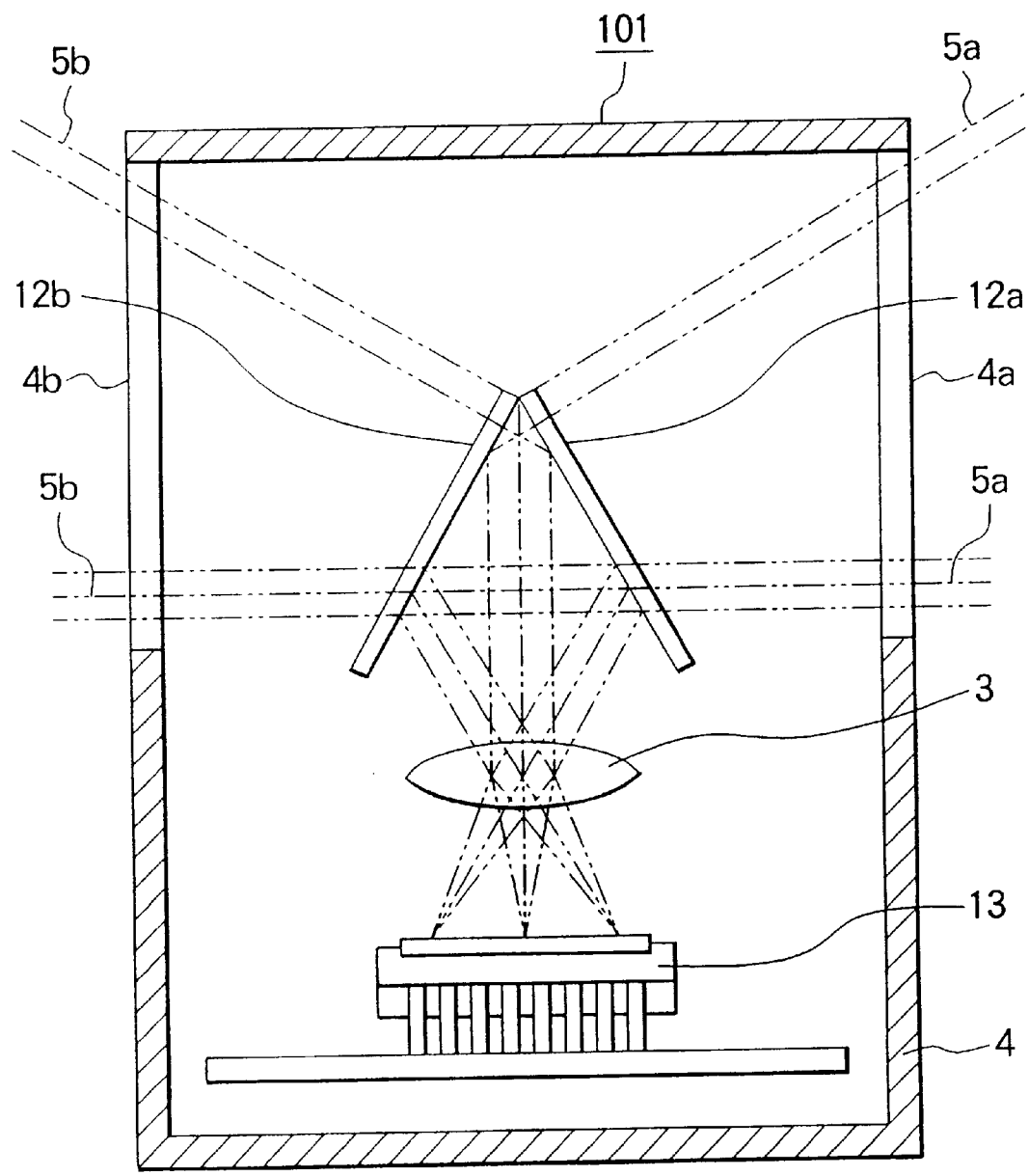
FIG. 3 is a sectional view of a camera in accordance with a second embodiment of the present invention.

In the case of the aforementioned "Embodiment 1", Further, the prism 1 is used as the optical element for reflecting each of the extraneous light rays 5a and 5b once and for leading the extraneous light to the image formation lens 3. However, in the case of this "Embodiment 2", two semitransparent mirrors 12a and 12b are used as shown in FIG. 3.

These semitransparent mirrors 12a and 12b are placed in a stage prior to the image formation lens 3 so that the leading edges thereof are made to coincide with each other, that the rear edges thereof are set away from each other and that these semitransparent mirrors 12a and 12b are symmetrical with espect to the optical axis of the image formation lens 3.

In the case of a camera 101 configured in this way, the extraneous light 5a coming from the right (from the right as viewed in FIG. 3) is incident on the outer casing 4 through the entrance window 4a, and reaches the semitransparent mirror 12a. Further, the extraneous light 5a is transmitted by the semitransparent mirror 12a and is then reflected by the semitransparent mirror 12b. Subsequently, the extraneous light 5a is incident on the image formation lens 3, so that an inverted mirror image is formed on the right-hand half of the imaging plane of the image pickup device 13.

On the other hand, the extraneous light 5b coming from the left (namely, from the left as viewed in FIG. 3) is incident on the outer casing 4 through the entrance window 4b, and then reaches the semitransparent mirror 12b. Further, the extraneous light 5b is then transmitted by the semitransparent mirror 12b and is subsequently reflected by the semitransparent mirror 12a, and is finally incident on the image formation lens 3, so that an inverted mirror image is formed on the left-side half of the imaging plane of the image pickup device 13.

Therefore, in the case of this "Embodiment 2", namely, the camera 101, advantages similar to those of the aforesaid "Embodiment 1" are obtained.

Moreover, in the case of the apparatus for visual recognition of surroundings of a vehicle using this camera 101, advantages similar to those of the aforesaid "Embodiment 1" are obtained.

Embodiment 3

In the case of this "Embodiment 3", semitransparent mirror coats are applied to the surfaces 2a and 2b of the prism 1. Incidentally, the rest of the configuration of the camera is the same as of the aforementioned "Embodiment 1".

In accordance with this "Embodiment 3", because the semitransparent coats are applied to the surfaces 2a and 2b of the prism 1, predetermined refractive index is obtained on the surfaces 2a and 2b of the prism 1, regardless of the glass material of the prism 1. Thus, optical materials, such as PMMA, which has a low refractive index but is inexpensive and excels in formability, may be used as the glass material of the prism 1.

Moreover, when applying the camera of this "Embodiment 3" to an apparatus for visual recognition of surroundings of a vehicle, advantages similar to those of the aforementioned "Embodiment 1" are obtained.

Embodiment 4

This "Embodiment 4" uses a prism 1A, which is formed as a square pillar so that the section is shaped like a regular triangle and the angles formed among the surfaces 2a, 2b and 2c of the prism 1 are 60 degrees.

Incidentally, the rest of the configuration of the camera is the same as of the aforementioned "Embodiment 1".

Generally, in the case that the prism is placed in a stage prior to the image formation lens 3, color blurring occurs in an obtained image owing to the dispersion of light.

However, in the case of this "Embodiment 4", the prism 1A is formed like a square pillar which has a regular triangle section. Thus, in regard to the optical performance, the prism 1A becomes equivalent to a parallel plate. Thereby, no color blurring occurs therein. Consequently, a high-picture-quality image can be obtained.

Further, when applying the camera of this "Embodiment 4" to an apparatus for visual recognition of surroundings of a vehicle, a high-picture-quality monitor television image is obtained. Thereby, the driver can (visually) recognize the conditions of blind spots more easily.

Hereinafter, it will be described with reference to FIG. 4 the reason why the prism 1A is equivalent to a parallel plate in regard to the optical performance.

Figure 4:
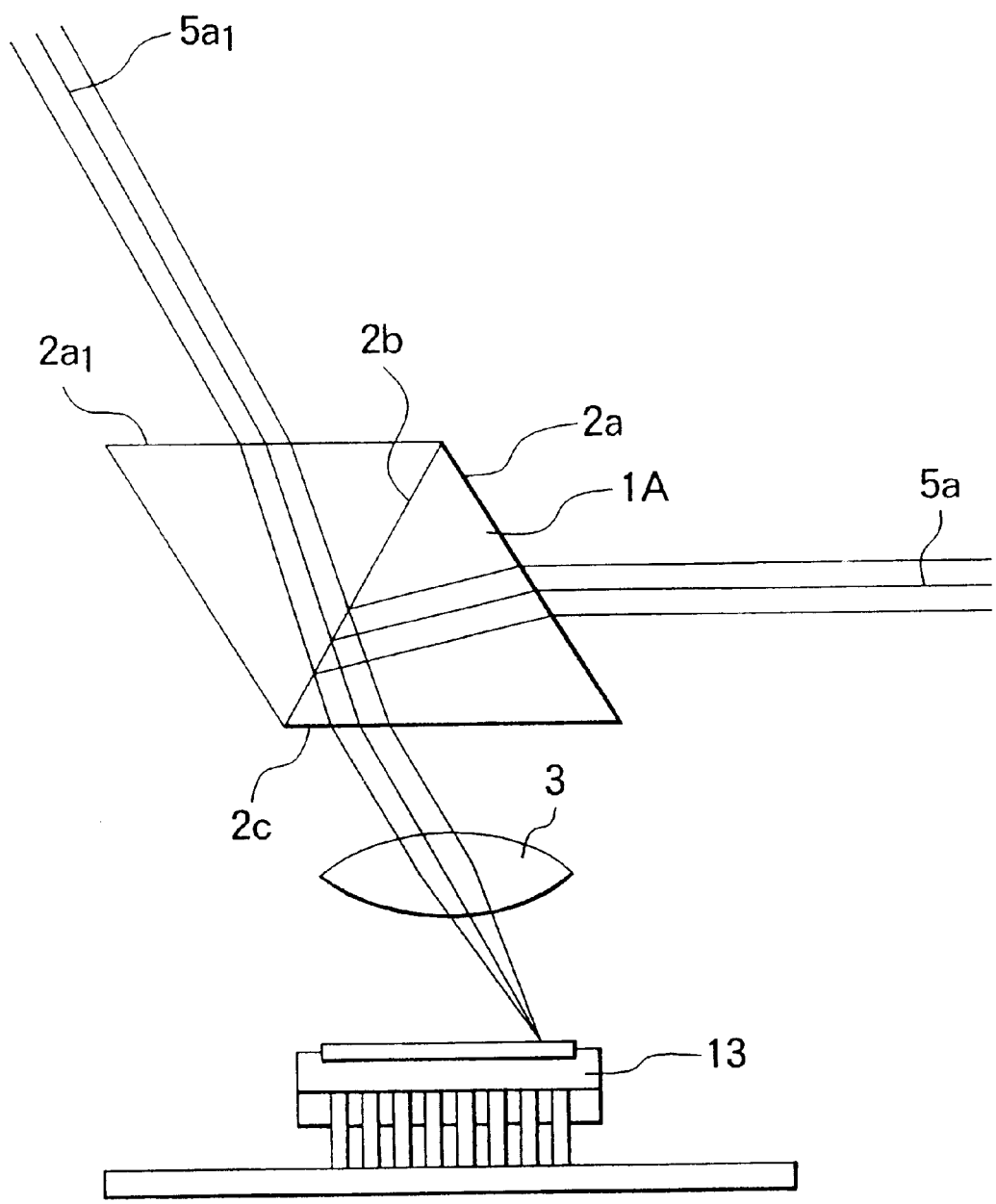
FIG. 4 is a diagram illustrating light rays impinging on and travelling through prism portions of a camera in accordance with a fourth embodiment of the present invention.

As illustrated in FIG. 4, it is supposed that light rays, which are symmetrical with respect to the surface 2b, of the extraneous light 5a are extraneous light rays $5a_1$, and that a surface, which is symmetrical to the surface 2a with respect to the surface 2b, is a surface $2a_1$. At that time, if the extraneous light 5a reflected by the surface 2b is replaced with the extraneous light rays $5a_1$ which are transmitted by the surface 2b, the camera obtained in this manner is equivalent to the initial camera in regard to the optical performance. Moreover, the surface $2a_1$ is parallel to the surface 2c, so that the extraneous light $5a_1$ is transmitted by the parallel plate defined by two surfaces $2a_1$ and 2c. Namely, regarding the optical performance of the camera, the extraneous light 5a is equivalent to the extraneous light rays $5a_1$ transmitted by the parallel plate, which is defined by the two surface $2a_1$ and 2c.

Embodiment 5

Figure 5:
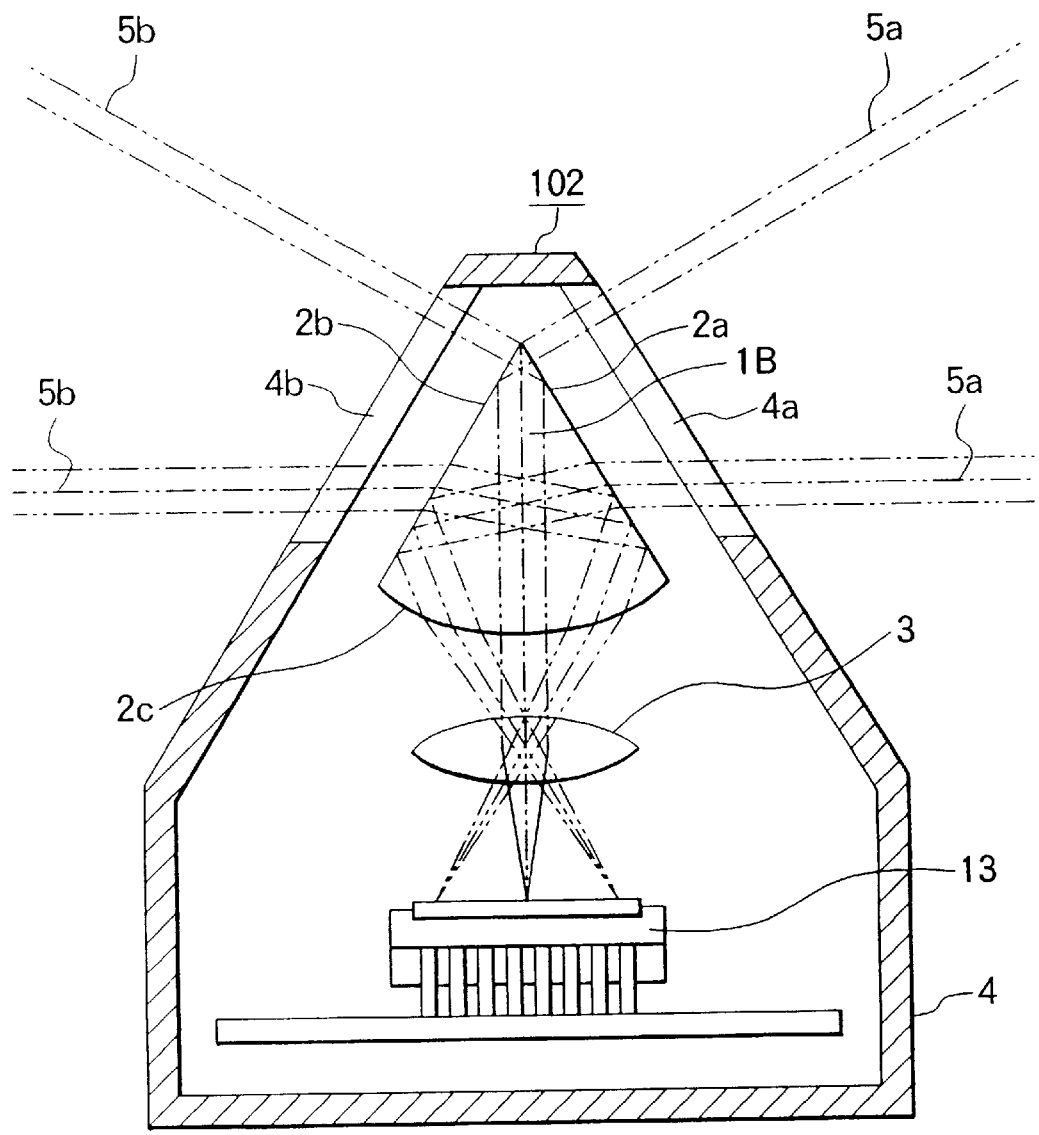
FIG. 5 is a sectional view of a camera in accordance with a fifth embodiment of the present invention.

In the case of this "Embodiment 5", as shown in FIG. 5, an angle formed by the surfaces 2a and 2b is 60 degrees. Further, this "Embodiment 5" uses a prism 1B shaped like a square pillar, which has a sectorial section, in such a manner that a surface c is formed like a cylindrical surface that is a lens surface.

Incidentally, the rest of the configuration of this "Embodiment 5" is similar to the corresponding part of the configuration of the aforementioned "Embodiment 1".

Figure 6:
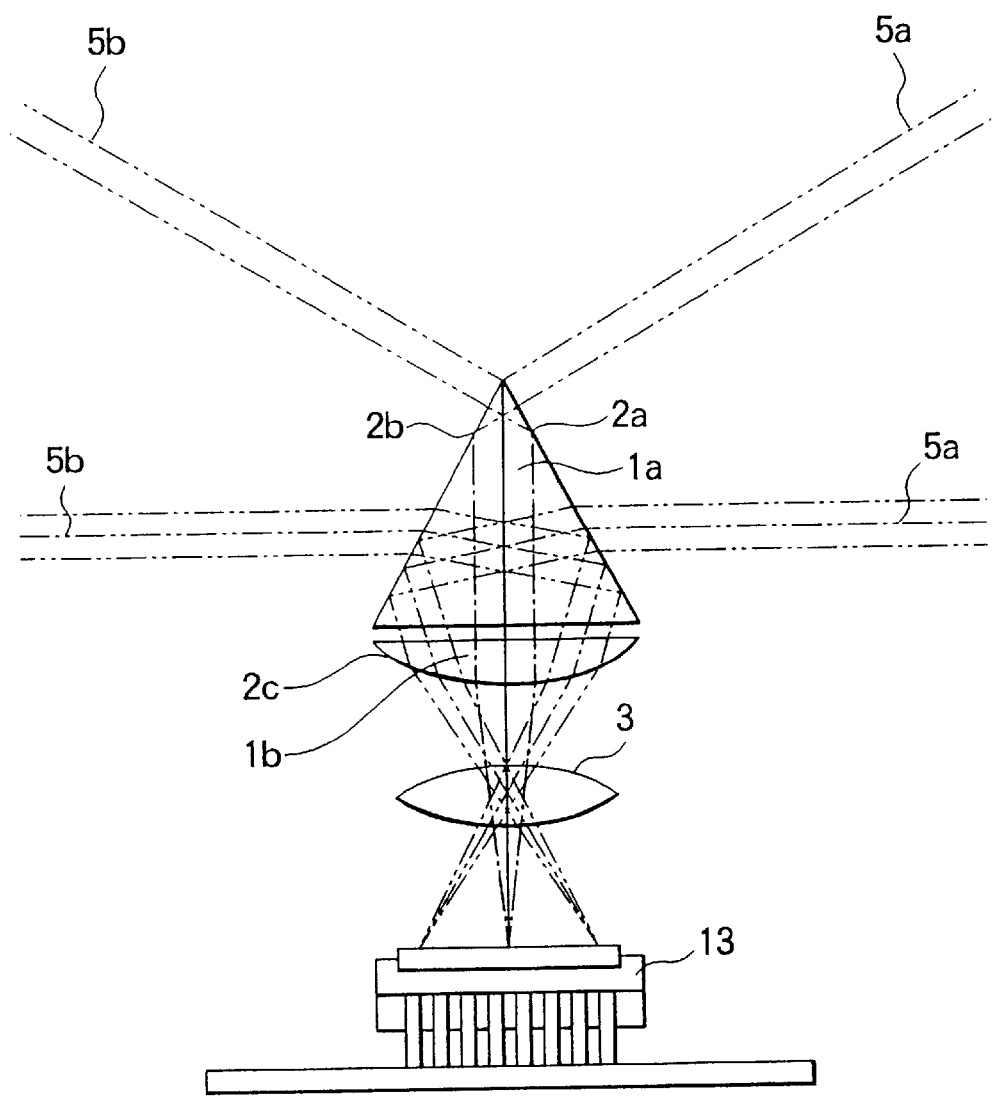
FIG. 6 is a diagram illustrating prism portions of the camera in accordance with the fifth embodiment of the present invention.

As shown in FIG. 6, the prism 1B of this "Embodiment 5" is considered as a composite consisting of a prism 1a, which is formed like a square pillar having a triangular section, and a prism 1b which has an inner surface on the side of the prism 1a is formed like a plane and an outer surface is formed like a cylindrical surface.

Thus, in the case of this "Embodiment 5", an occurrence of color blurring can be prevented by the prism 1a, similarly as in the case of the aforementioned "Embodiment 4". Thereby, a high-picture-quality image is obtained. Furthermore, the prism 1b has a lens function. Consequently, the image formation lens 3 can be simplified or omitted.

Further, if the camera of this "embodiment 5" is applied to an apparatus for visual recognition of surroundings of a vehicle, advantages similar to those of the aforementioned "Embodiment 1" are obtained.

Embodiment 6

In the case of this "Embodiment 6", the refractive index of the glass material of the prism 1A formed like a square pillar having a regular triangle section in the case of the aforementioned "Embodiment 4" is prescribed.

Namely, the refractive index of the glass material is prescribed in such a way that the angle of incidence on the surface 2b is not less than a critical angle after the extraneous light 5a coming from the right is transmitted by the surface 2a of the prism 1A, and that the angle of incidence on the surface 2a is not less than the critical angle after the extraneous light 5b coming from the left is transmitted by the surface 2b of the prism 1A.

In the case of this "Embodiment 6", the extraneous light rays 5a and 5b undergo total reflections on the surface 2b and 2a, respectively. The extraneous light rays 5a and 5b can be incident on the image formation lens 3 without losses of the quantity of light of the extraneous light rays 5a and 5b. Consequently, a high-picture-quality image can be obtained.

Further, when applying the camera of this "Embodiment 6" to an apparatus for visual recognition of surroundings of a vehicle, a high-picture-quality monitor television image can be obtained. Consequently, the driver can (visually) recognize the conditions of blind spots more easily.

Figure 7:
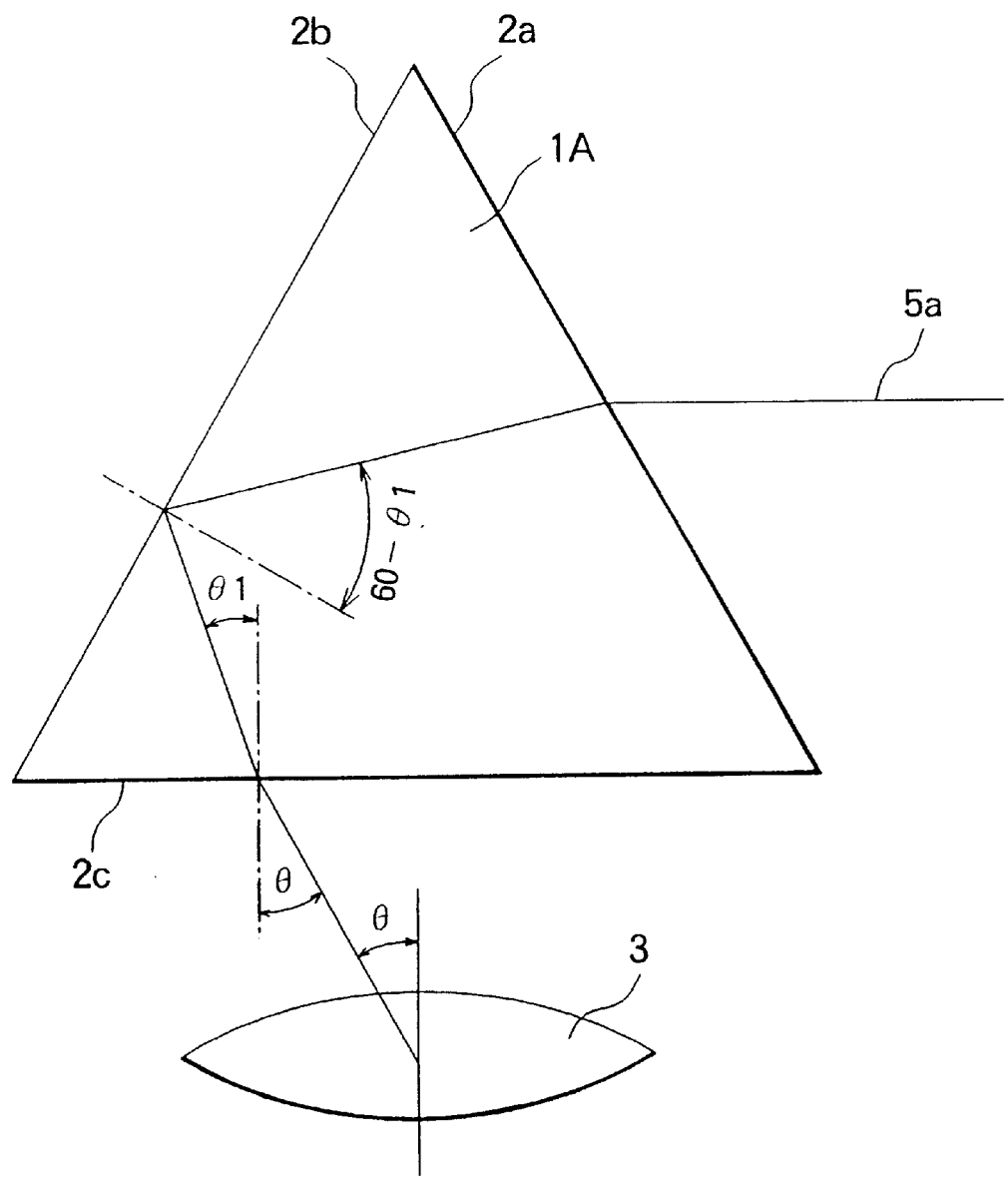
FIG. 7 is a diagram illustrating light rays impinging on and travelling through prism portions of a camera in accordance with a sixth embodiment of the present invention.

Hereinafter, the refractive index N, at which the angle of incidence on the surface 2a is not less than the critical angle, of the glass material will be described with reference to FIG. 7.

Refraction on the surface 2c of the prism 1A is expressed by the following equation (1) according to Snell's law (or theorem). Incidentally, $\theta$ designates a field angle (namely, an angle of field, an angle of view, or angle of coverage (a half angle); and $\theta_1$ designates an angle of incidence on the surface 2c.

Thus, the angle of incidence on the surface 2b of the prism 1 is $(60°-\theta_1)$. The condition for causing the total reflection on the surface 2b is given by the following inequality (2). Thus, the following inequality (3) is obtained from the equation (1) and the inequality (2). Consequently, the prism 1A has only to be manufactured by using a glass material whose refractive index satisfies the following inequality (3).

$$N \cdot \sin \theta_1 = \sin \theta \quad (1)$$

$$60° - \theta_1 \geq \sin^{-1}(1/N) \quad (2)$$

$$60° - \sin^{-1}(\sin \theta/N) \geq \sin^{-1}(1/N) \quad (3)$$

where $\theta$: a field angle (a half-angle) of the image formation lens; N: the refractive index of the glass material of the prism; and $\theta_1$: an angle of incidence on the surface 2c of the prism.

Here, if the field angle $\theta$ of the image formation lens 3 is 30 degrees by way of example, the refractive index N of the prism 1A should be not less than 1.52753.

Incidentally, in the foregoing description of the aforementioned "Embodiment 6", the prism 1A of the aforesaid "Embodiment 4" has been described. However, if $\theta$ (namely, the field angle of the image formation lens) in the aforementioned inequality (3) is considered as what is called an imaging field angle of a composite consisting of the prism 1b, which is a lens component of a prism 1B, and the image formation lens 3 in the aforementioned "Embodiment 5", it can be understood that the foregoing description relating to the prism 1A of the aforementioned "Embodiment 4" holds for the prism 1B of the aforementioned "Embodiment 5".

Embodiment 7

Figure 8:
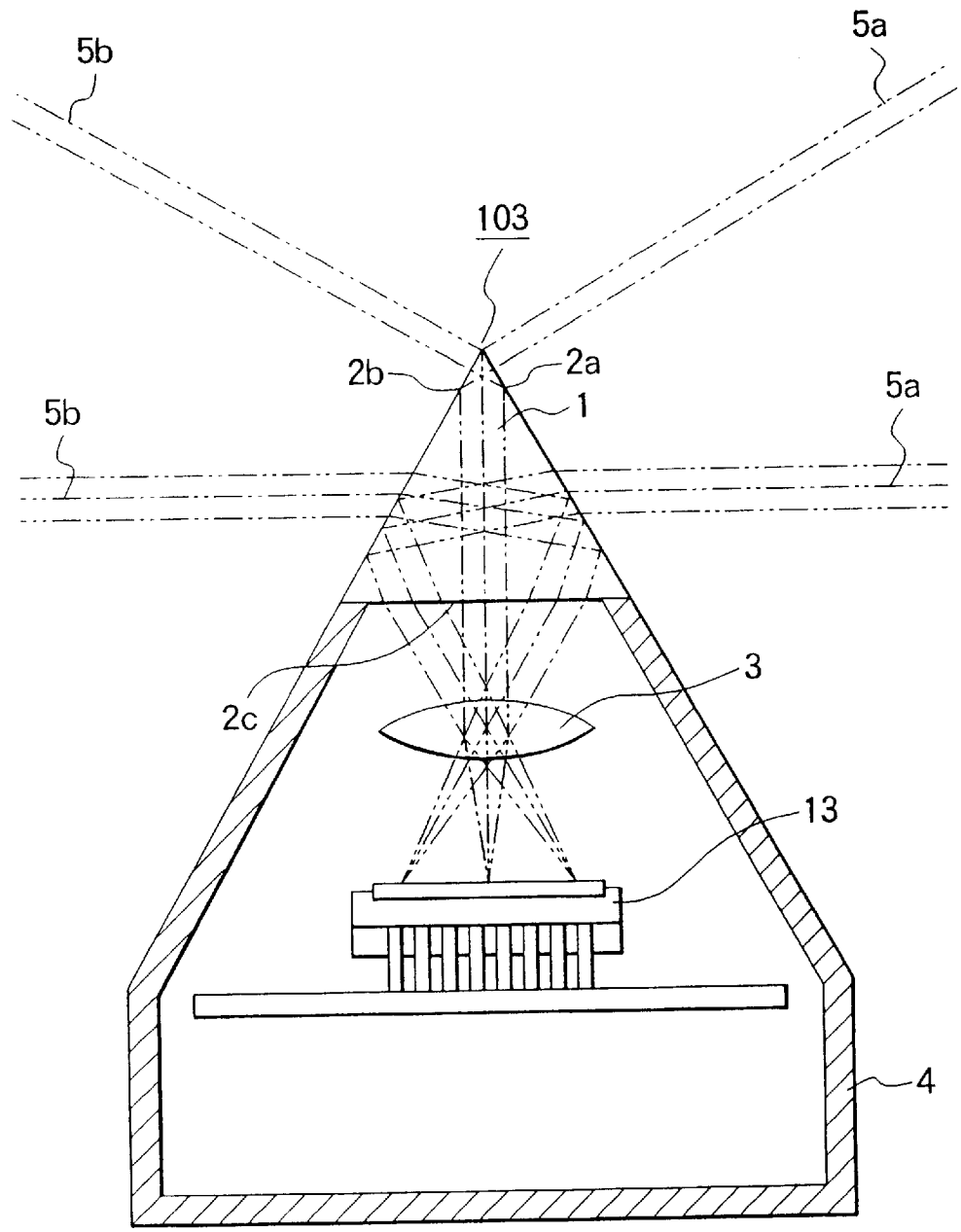
FIG. 8 is a sectional view of a camera in accordance with a seventh embodiment of the present invention.

In the case of this "Embodiment 7", as illustrated in FIG. 8, the prism 1 is formed in such a manner as to be integral with the outer casing 4.

Incidentally, the rest of the configuration of this "Embodiment 7" is similar to the corresponding part of the aforementioned "Embodiment 1".

In the case of the camera 103 constructed in this way, the prism 1 is formed in such a way as to be integral with the outer casing 4. Thus, the miniaturization of the camera can be achieved.

Further, if applying the camera 103 of this "embodiment 7" to an apparatus for visual recognition of surroundings of a vehicle, the capacity of the outer casing 4 can be reduced. The size of the camera can be reduced by that amount.

Incidentally, in the case of the aforementioned "Embodiment 7", the prism 1 and the outer casing 4 of the aforementioned "Embodiment 1" are formed in such a manner as to be integral with each other. However, such a configuration may be applied to other embodiments.

Embodiment 8

Figure 9:
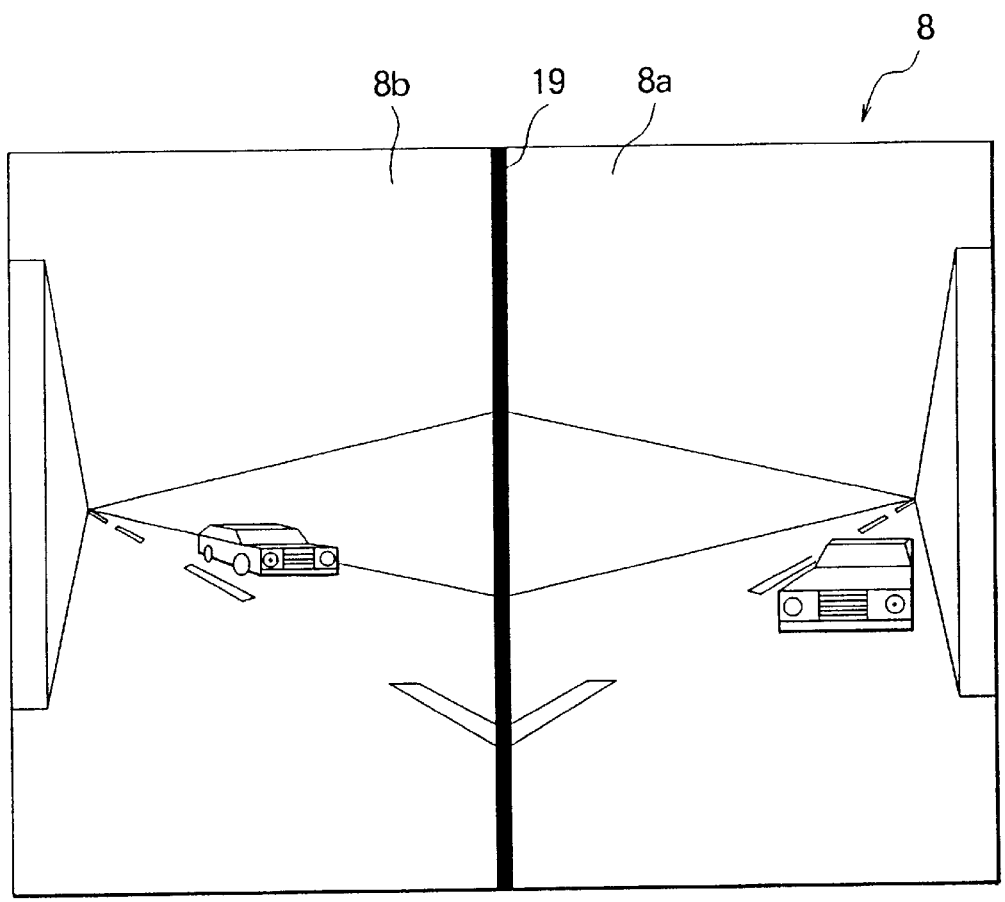
FIG. 9 is a front view of a display presented on the screen of a monitor television in an apparatus for visual recognition of surroundings of a vehicle, which is equipped with a camera in accordance with an eighth embodiment of the present invention.

In the case of this "embodiment 8", as shown in FIG. 9, a boundary line 19 is indicated on the boundary between a right-hand side image 8a and a left-hand side image 8b displayed on the screen of the monitor television 8. Incidentally, it is assumed that one of the cameras of the aforementioned embodiments is used as the camera mounted on the vehicle.

Further, in the case of this "Embodiment 8", means for outputting an additional signal representing the (boundary) line onto a video signal line in a camera circuit is employed as means for displaying the boundary line 19. Consequently, there is provided an apparatus for visual recognition of surroundings of a vehicle, by which images which are easy for the driver to observe can be obtained.

Incidentally, although the means for outputting an additional signal representing the (boundary) line onto a video signal line in a camera circuit is employed in the case of the aforementioned "Embodiment 8" as the means for displaying the boundary line 19, a signal representing the boundary line may be added on the circuit of the monitor television 8. Alternatively, the boundary line may be drawn on the image on the screen of the monitor television 8.

Embodiment 9

Figure 10:
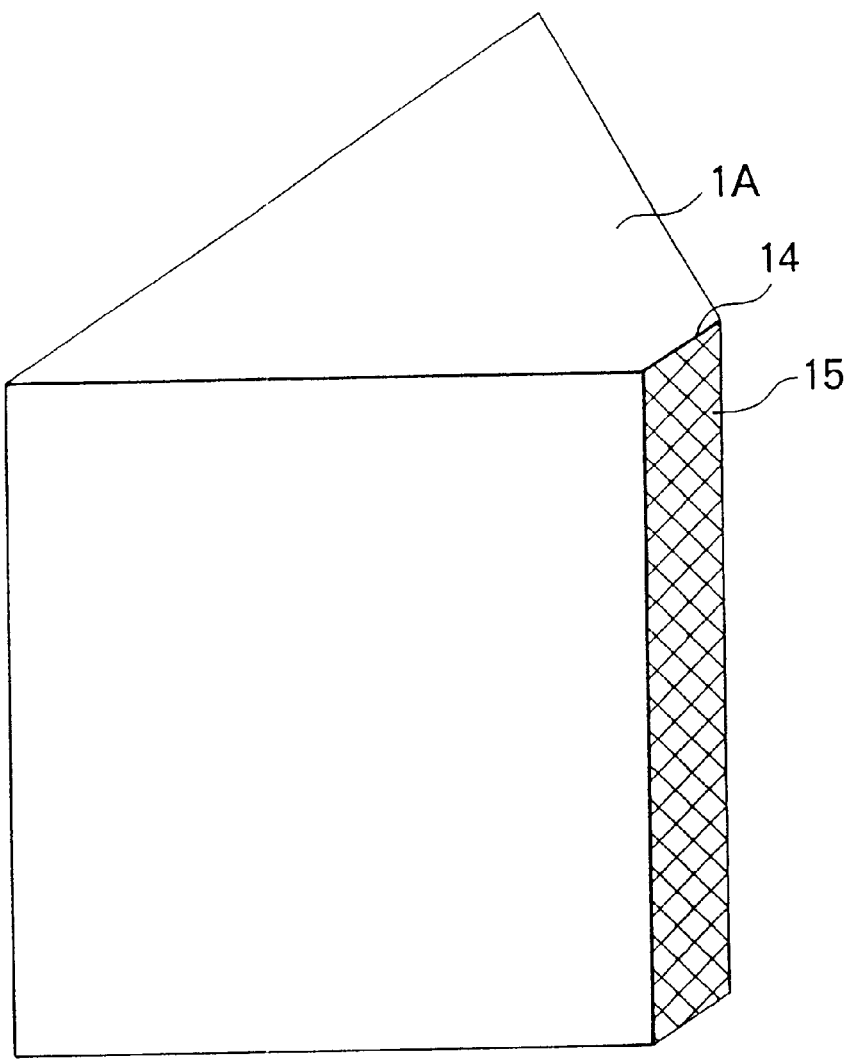
FIG. 10 is a perspective view of a prism portion of a camera in accordance with a ninth embodiment of the present invention.
Figure 11:
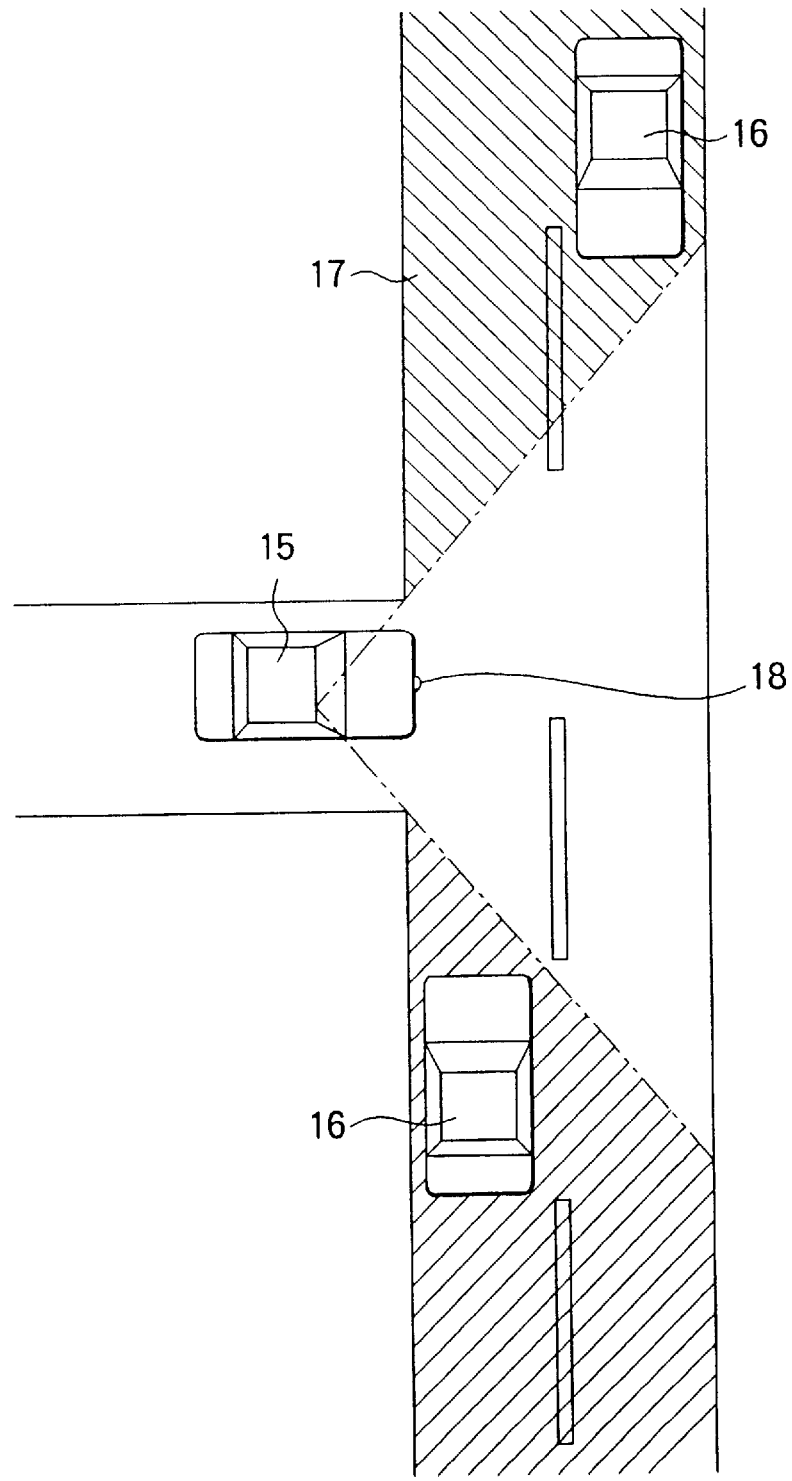
FIG. 11 is a diagram illustrating an operation of a motor vehicle equipped with the conventional apparatus for visual recognition of surroundings of the motor vehicle.
Figure 12:
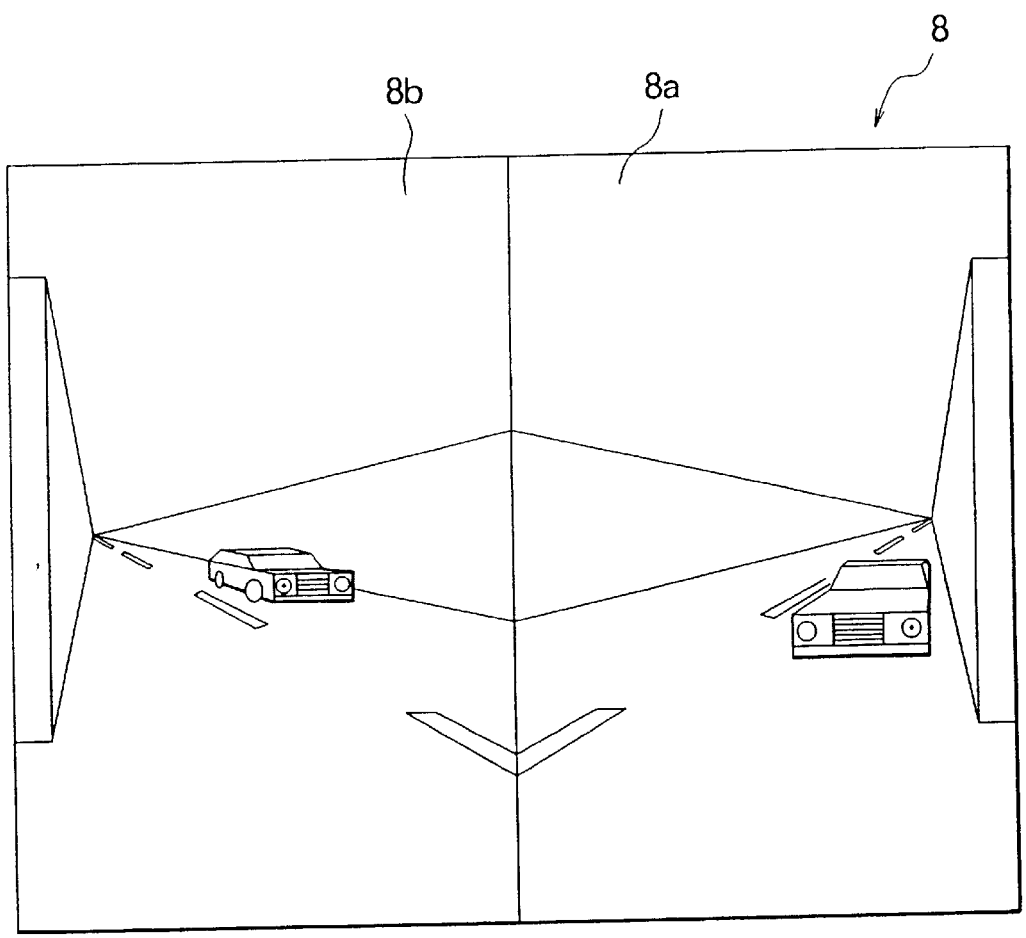
FIG. 12 is a front view of a display presented on the screen of a monitor television in an apparatus for visual recognition of surroundings of a vehicle.

Although the means for outputting an additional signal representing the boundary line onto the video signal line on the camera circuit is employed as the means for displaying the boundary line 19 in the aforementioned "Embodiment 8", means for making a chamfer portion on a ridge part of the prism 1A and applying ink to the chamfer portion as a light shielding material, as illustrated in FIG. 10, in the case of this "Embodiment 9".

In the case of this "Embodiment 9", inverted mirror images obtained from the extraneous light rays 5a and 5b respectively coming from the left and right and an image of the chamfer portion are formed on the image pickup device 13, so that the boundary line 19 is displayed on the boundary between the right-hand side image 8a and the left-hand side image 8b of the monitor television 8.

Therefore, in the case of the camera of this "Embodiment 9", advantages similar to those of the aforementioned "Embodiment 8" are obtained by the camera of this "Embodiment 9".

Further, if applying the camera of this "Embodiment 9" to an apparatus for visual recognition of surroundings of a vehicle, the boundary line 19 is indicated between the left-hand and right-hand images displayed on the screen of the monitor television. This facilitates the visual recognition of the conditions of blind spots by the driver.

Incidentally, in each of the aforementioned embodiments, a picture signal is converted into an image signal representing a normal image by flipping a mirror image, which is formed on the imaging plane of the image pickup device 13 and is represented by the picture signal, from side to side by using the mirror CCD as the image pickup device 13. Then, the image signal is outputted. However, signal conversion means for converting a picture signal, which represents a mirror image, into an image signal representing a normal image by flipping the mirror image from side to side is not limited to the mirror CCD. Other means being capable of flipping a (mirror) image, which is represented by the picture signal, from side to side may be used as the signal conversion means. For example, a mirror-image monitor television, by which an image is flipped from side to side, and a processing unit for carrying out an operation of flipping an image from side to side may be used as the signal conversion means. Furthermore, drivers may observe the screens of ordinary monitor televisions by causing the mirrors to reflect the image displayed on the screen of the monitor television.

Further, in the foregoing description of each of the aforementioned embodiments, it has been described that inverted mirror images, which are respectively obtained from the extraneous light rays impinging on the outer casing 4 from the left-hand and right-hand sides, are simultaneously formed on the left-hand and right-hand halves of the imaging plane of the image pickup device 13. However, in the case of the camera of the present invention, the extraneous light for forming an image on the imaging plane of the image pickup device 13 is not limited to light rays which are incident on the outer casing 4 from the left and right. By changing the position of the camera, inverted mirror images, which are obtained from extraneous light rays coming from two opposite directions at both sides of the outer casing 4, are simultaneously formed on the image pickup device 13 by performing a reflection of each of the images once.

With the aforementioned configuration, the present invention has the following advantages:

In accordance with the present invention, there is provided a camera that comprises: a housing having entrance windows, through each of which extraneous light are taken in, in both side portions thereof, respectively; an image pickup device mounted in this housing; and an optical element for reflecting the aforesaid extraneous light once, which is incident from a one of the aforesaid entrance windows, and for forming an inverted mirror image on an area of an imaging plane of the aforesaid image pickup device, which is on same side of the aforesaid one of the aforesaid entrance windows, and for reflecting the aforesaid extraneous light once, which is incident from the other of the aforesaid entrance windows, and for forming an inverted mirror image on an area of the aforesaid imaging plane of the aforesaid image pickup device, which is on same side of the aforesaid other of the aforesaid entrance windows. Thus, the reflection of the extraneous light is performed only once. Thereby, the configuration of the camera can be simplified. Consequently, a compact inexpensive camera is obtained.

Further, the aforesaid optical element comprises: an image formation lens, which is placed in a stage prior to the aforesaid image pickup device, for forming an image on the imaging plane of the aforesaid image pickup device from the extraneous light; and a prism formed as a square pillar which has a section shaped like an isosceles triangle and is disposed in a stage prior to the aforesaid image formation lens by making a bisector of a vertex angle of the isosceles triangle coincide with an optical axis of the aforesaid image formation lens. Thus, the configuration of the aforesaid optical element can be simplified.

Moreover, the surface, which corresponds to a base of the isosceles triangle, of the aforesaid prism is formed as a lens surface. The structure of the image formation lens is simplified.

Furthermore, the aforesaid prism is configured so that the vertex angle of the isosceles triangle of the section thereof is 60 degrees. Occurrence of color blurring is prevented. Consequently, a high-picture-quality image is obtained.

Additionally, the aforesaid prisms have a refractive index N determined by a following equation (3):

$$60°-\mathrm{Sin}^{-1}\{\mathrm{Sin}(\theta/N)\}\geq\mathrm{Sin}^{-1}(1/N) \qquad (3)$$

(incidentally, θ designates an imaging field angle (a half-angle)). Thus, losses of the quantity of the extraneous light can be eliminated. Consequently, a high-picture-quality image displays or representations, which the drivers can easily recognize, are obtained.

Further, a semitransparent mirror coat is applied to each of surfaces respectively corresponding to two sides at a vertex of the isosceles triangle of the section of the aforesaid prism. Thus, a low refractive-index glass material may be used as the material of the aforesaid prism. Consequently, the cost of the camera can be reduced by that amount.

Additionally, the aforesaid prism is formed in such a manner as to be integral with the aforesaid housing, wherein surfaces of the aforesaid prism, which correspond to two sides at a vertex of the isosceles triangle of the section of the aforesaid prism, are adapted to function as the aforesaid entrance windows, respectively. Thus, the miniaturization of the camera can be achieved.

Moreover, the chamfer portion is formed on the ridge portion composed of vertexes of the isosceles triangles of the sections of the aforesaid prism. The light shielding portion is provided on the aforesaid chamfer portion. Thus, a boundary line between images formed on the imaging plane of the image pickup device is obtained without performing a special signal processing.

Furthermore, the aforesaid optical element comprises: an image formation lens, which is placed in a stage prior to the aforesaid image pickup device, for forming an image on the imaging plane of the aforesaid image pickup device from the extraneous light; and pair of semitransparent mirrors placed in a stage prior to the aforesaid image formation lens in such a manner as to form a predetermined angle and be symmetrical with respect to an optical axis of the aforesaid image formation lens. Thus, the configuration of the aforesaid optical element can be simplified. In addition, the cost of the camera can be reduced.

In accordance with the present invention, there is provided an apparatus for visual recognition of surroundings of a vehicle, which comprises: a housing mounted in a front portion of a vehicle and provided with left-side and right-side entrance windows, through each of which extraneous light is taken in, in both of left and right side portions thereof in a travelling direction of the aforesaid vehicle, respectively; an image pickup device mounted in said housing so that an imaging plane thereof faces a region located in front of the aforesaid vehicle; an optical element for reflecting the aforesaid extraneous light once, which is incident from the aforesaid left-side entrance window, and for forming an inverted mirror image on a left-side area of an imaging plane of the aforesaid image pickup device, which corresponds to the aforesaid left-side entrance window, and for reflecting the aforesaid extraneous light once, which is incident from the aforesaid right-side entrance window, and for forming an inverted mirror image on a right-side area of the aforesaid imaging plane of the aforesaid image pickup device, which corresponds to the aforesaid right-side entrance window; signal conversion means for converting a picture signal, which represents the inverted mirror image formed on the aforesaid imaging plane, into an image signal which represents an inverted normal image obtained by flipping the inverted mirror image from side to side; and display means for inputting the image signal, which represents the inverted normal image, from the aforesaid signal conversion means and for displaying an erected normal image. Thus, an erected normal image obtained from the extraneous light coming from the right is displayed on the right-hand screen of the display means, while an erected normal image obtained from the extraneous light coming from the left is displayed on the left-hand screen of the display means. Thus, there can be obtained an apparatus for visual recognition of surroundings of a vehicle, wherein the direction, in which an image is displayed on the screen of the monitor television, is in agreement with the direction of incidence of the light representing the image, and wherein the images displayed on the screen of the monitor television is easy for the driver to observe.

Further, in this apparatus, the aforesaid optical element comprises: an image formation lens, which is placed in a stage prior to the aforesaid image pickup device, for forming an image on the imaging plane of the aforesaid image pickup device from the extraneous light; and a prism formed as a square pillar which has a section shaped like an isosceles triangle and is disposed in a stage prior to the aforesaid image formation lens by making a bisector of a vertex angle of the isosceles triangle coincide with an optical axis of the aforesaid image formation lens. Thus, the construction of the aforesaid optical element can be simplified.

Further, in the apparatus, a surface, which corresponds to a base of the isosceles triangle, of the aforesaid prism is formed as a lens surface. Thus, the simplification or omission of the image formation lens can be achieved. The size of the apparatus can be decreased by that amount.

Moreover, in the apparatus, the aforesaid prism is constituted so that the vertex angle of the isosceles triangle of the section thereof is 60 degrees. Thereby, an occurrence of color blurring is prevented. Moreover, there are obtained high-picture-quality image displays which the drivers can easily recognize.

Furthermore, in the apparatus, the aforesaid prisms have a refractive index N determined by a following equation (3):

$$60° - \text{Sin}^{-1}\{\text{Sin}(\theta/N)\} \geq \text{Sin}^{-1}(1/N) \quad (3)$$

(incidentally, θ designates an imaging field angle (a half-angle)). Thus, losses of the quantity of the extraneous light can be eliminated. Consequently, a high-picture-quality image displays or representations, which the drivers can easily recognize, are obtained.

Additionally, in the apparatus, a semitransparent mirror coat is applied to each of surfaces respectively corresponding to two sides at a vertex of the isosceles triangle of the section of the aforesaid prism. Thus, a low-refractive-index glass material can be used as the material of the prism. The cost of the apparatus can be reduced.

Besides, in the apparatus, the aforesaid prism is formed in such a manner as to be integral with the aforesaid housing, wherein surfaces of the aforesaid prism, which correspond to two sides at a vertex of the isosceles triangle of the section of the aforesaid prism, are adapted to function as the aforesaid entrance windows, respectively. The miniaturization of the apparatus can be attained.

Further, in the apparatus, a chamfer portion is formed on a ridge portion composed of vertexes of the isosceles triangles of the sections of the aforesaid prism. Moreover, a light shielding portion is provided on the aforesaid chamfer portion. Thus, a boundary line between images formed on the imaging plane of the image pickup device is obtained without performing a special signal processing. Consequently, there have been obtained image displays or representations which the drivers can easily observe.

Furthermore, in the apparatus, the aforesaid optical element comprises: an image formation lens, which is placed in a stage prior to the aforesaid image pickup device, for forming an image on the imaging plane of the aforesaid image pickup device from the extraneous light; and a pair of semitransparent mirrors placed in a stage prior to the aforesaid image formation lens in such a manner as to form a predetermined angle and be symmetrical with respect to an optical axis of the aforesaid image formation lens. Thus, the configuration of the optical element can be simplified.

Additionally, in the apparatus, the aforesaid image pickup device is adapted to output a picture signal representing an image obtained by flipping an inverted mirror image, which is formed on the imaging plane, from side to side and has a function as signal conversion means. Thus, it is unnecessary to provide special signal conversion means in the apparatus. Consequently, the miniaturization of the apparatus can be achieved. Moreover, the cost of the apparatus can be reduced.

Although the preferred embodiments of the present invention have been described above, it should be understood that the present invention is not limited thereto and that other modifications will be apparent to those skilled in the art without departing from the spirit of the invention.

The scope of the present invention, therefore, is to be determined solely by the appended claims.

What is claimed is:

1. A camera comprising:
   a housing having first and second entrance windows disposed on opposite sides of said housing, through each of which extraneous light is taken in;
   an image pickup device mounted in said housing;
   an optical element for reflecting said extraneous light once, which is incident from said first entrance window, and for forming an inverted mirror image on an area of an imaging plane of said image pickup device, which is on a same side of said housing as said first entrance window, and for reflecting said extraneous light once, which is incident from said second entrance window, and for forming an inverted mirror image on the area of said imaging plane of said image pickup device, which is on a same side of said housing as said second entrance window;
   wherein said optical element comprises: an image formation lens, placed in a stage prior to said image pickup device, for forming an image on the imaging plane of said image pickup device from the extraneous light; and a prism formed as a square pillar which has a section shaped like an isosceles triangle and is disposed in a stage prior to said image formation lens by making a bisector of a vertex angle of the isosceles triangle coincide with an optical axis of said image formation lens.

2. The camera according to claim 1, wherein a surface, which corresponds to a base of the isosceles triangle, of said prism is formed as a lens surface.

3. The camera according to claim 1, wherein the vertex angle of the isosceles triangle of the section of said prism is 60 degrees.

4. The camera according to claim 1, wherein said prism has a refractive index N determined by a following equation (3):

$$60° - \text{Sin}^{-1}\{\text{Sin}(\theta/N)\} \geq \text{Sin}^{-1}(1/N) \quad (3)$$

(incidentally, θ designates an imaging field angle (a half-angle)).

5. The camera according to claim 1, wherein a semitransparent mirror coat is applied to each surface respectively corresponding to two sides at a vertex of the isosceles triangle of the section of said prism.

6. The camera according to claim 1, wherein said prism is formed in such a manner as to be integral with said housing, wherein surfaces of said prism, which correspond to two sides at a vertex of the isosceles triangle of the section of said prism, are adapted to function as said entrance windows, respectively.

7. The camera according to claim 1, wherein a chamfer portion is formed on a ridge portion composed of a vertex of the isosceles triangle of the section of said prism, wherein a light shielding portion is provided on said chamfer portion.

8. A camera comprising:

a housing having first and second entrance windows disposed on opposite sides of said housing, through each of which extraneous light is taken in;

an image pickup device mounted in said housing;

an optical element for reflecting said extraneous light once, which is incident from said first entrance window, and for forming an inverted mirror image on an area of an imaging plane of said image pickup device, which is on a same side of said housing as said first entrance window, and for reflecting said extraneous light once, which is incident from said second entrance window, and for forming an inverted mirror image on the area of said image pickup device, which is on a same side of said housing as said second entrance window;

wherein said optical element comprises: an image formation lens, placed in a stage prior to said image pickup device, for forming an image on the imaging plane of said image pickup device from the extraneous light; and a pair of semitransparent mirrors placed in a stage prior to said image formation lens in such a manner as to form a predetermined angle and be symmetrical with respect to an optical axis of said image formation lens.

9. An apparatus for visual recognition of surroundings of a vehicle, comprising:

a housing mounted in a front portion of a vehicle and provided with left-side and right-side entrance windows, through each of which extraneous light is taken in, in both of left and right side portions thereof in a travelling direction of said vehicle, respectively;

an image pick up device mounted in said housing so that an imaging plane thereof, where extraneous light entering from said left-side and right-side entrance windows is incident, faces a region forward of said vehicle;

an optical element for reflecting said extraneous light once, which is incident from said left-side entrance window, and for forming an inverted mirror image on a left-side area of an imaging plane of said image pickup device, which corresponds to said left-side entrance window, and for reflecting said extraneous light once, which is incident from said right-side entrance window, and for forming an inverted mirror image on a right-side area of said imaging plane of said image pickup device, which corresponds to said right-side entrance window;

signal conversion means for converting a picture signal, which represents the inverted mirror image formed on said imaging plane, into an image signal which represents an inverted normal image obtained by flipping the inverted mirror image from side to side; and display means for inputting the image signal, which represents the inverted normal image, from said signal conversion means and for displaying an erected normal image;

wherein said optical element comprises: an image formation lens, placed in a stage prior to said image pickup device, for forming an image on the imaging plane of said image pickup device from the extraneous light; and a prism formed as a square pillar which has a section shaped like an isosceles triangle and is disposed in a stage prior to said image formation lens by making a bisector of a vertex angle of the isosceles triangle coincide with an optical axis of said image formation lens.

10. The apparatus for visual recognition of surroundings of a vehicle, according to claim 9, wherein a surface, which corresponds to a base of the isosceles triangle, of said prism is formed as a lens surface.

11. The apparatus for visual recognition of surroundings of a vehicle, according to claim 9, wherein the vertex angle of the isosceles triangle of the section of said prism is 60 degrees.

12. The apparatus for visual recognition of surroundings of a vehicle, according to claim 9, wherein said prism has a refractive index N determined by a following equation (3):

$$60°-\mathrm{Sin}^{-1}\{\mathrm{Sin}(\theta/N)\} \geq \mathrm{Sin}^{-1}(1/N) \quad (3)$$

(incidentally, θ designates an imaging field angle (a half-angle)).

13. The apparatus for visual recognition of surroundings of a vehicle, according to claim 9, wherein a semitransparent mirror coat is applied to each surface respectively corresponding to two sides at a vertex of the isosceles triangle of the section of said prism.

14. The apparatus for visual recognition of surroundings of a vehicle, according to claim 9, wherein said prism is formed in such a manner as to be integral with said housing, wherein surfaces of said prism, which correspond to two sides at a vertex of the isosceles triangle of the section of said prism, are adapted to function as said entrance windows, respectively.

15. The apparatus for visual recognition of surroundings of a vehicle, according to claim 9, wherein a chamfer portion is formed on a ridge portion composed of a vertex of the isosceles triangle of the section of said prism, wherein a light shielding portion is provided on said chamfer portion.

16. An apparatus for visual recognition of surroundings of a vehicle, comprising:

a housing mounted in a front portion of a vehicle and provided with left-side and right-side entrance windows, through each of which extraneous light is taken in, in both of left and right side portions thereof in a travelling direction of said vehicle, respectively;

an image pick up device mounted in said housing so that an imaging plane thereof, where extraneous light entering from said left-side and right-side entrance windows is incident, faces a region forward of said vehicle;

an optical element for reflecting said extraneous light once, which is incident from said left-side entrance window, and for forming an inverted mirror image on a left-side area of an imaging plane of said image pickup device, which corresponds to said left-side entrance window, and for reflecting said extraneous light once, which is incident from said right-side entrance window, and for forming an inverted mirror image on a right-side area of said imaging plane of said image pickup device, which corresponds to said right-side entrance window;

signal conversion means for converting a picture signal, which represents the inverted mirror image formed on said imaging plane, into an image signal which represents an inverted normal image obtained by flipping the inverted mirror image from side to side; and display means for inputting the image signal, which represents the inverted normal image, from said signal conversion means and for displaying an erected normal image;

wherein said optical element comprises: an image formation lens, placed in a stage prior to said image pickup device, for forming an image on the imaging plane of said image pickup device from the extraneous light; and a pair of semitransparent mirrors placed in a stage prior to said image formation lens in such a manner as to form a predetermined angle and be symmetrical with respect to an optical axis of said image formation lens.

* * * * *